(12) United States Patent
Cooper et al.

(10) Patent No.: US 6,868,058 B1
(45) Date of Patent: Mar. 15, 2005

(54) MULTI-NODE HFC DIVERSE ROUTE RECOVERY ALGORITHM USING MULTI-STAGE, WIDE-MODE MARSHAL WITH BRANCH FAILURE DETECTION

(75) Inventors: William L. Cooper, Alpharetta, GA (US); David H. Cullen, Alpharretta, GA (US)

(73) Assignee: Arris International, Inc., Suwanee, GA (US)

( * ) Notice: Subject to any disclaimer, the term of this patent is extended or adjusted under 35 U.S.C. 154(b) by 0 days.

(21) Appl. No.: 09/558,826

(22) Filed: Apr. 26, 2000

(51) Int. Cl.[7] ................................................. H04J 3/17
(52) U.S. Cl. ...................... 370/216; 370/245; 370/337; 370/347; 370/458; 455/67.11; 455/115.1; 455/103
(58) Field of Search .......................... 370/225, 458–460, 370/329, 216, 217, 242, 245, 248, 252, 336, 337, 345, 347, 442, 294, 384, 508, 520; 455/103, 450, 509, 67.11, 115.1; 348/522

(56) References Cited

U.S. PATENT DOCUMENTS

| | | | | |
|---|---|---|---|---|
| 5,768,269 A | * | 6/1998 | Rakib et al. | 370/342 |
| 5,793,772 A | * | 8/1998 | Burke et al. | 370/508 |
| 5,889,765 A | * | 3/1999 | Gibbs | 370/310.2 |
| 6,031,846 A | * | 2/2000 | Gurusami et al. | 370/508 |
| 6,279,158 B1 | * | 8/2001 | Geile et al. | 725/126 |

* cited by examiner

*Primary Examiner*—Alpus H. Hsu
*Assistant Examiner*—Justin M. Philpott (57) ABSTRACT

A method for synchronizing transmitters within a communications network by utilizing wide-mode marshaling. Wide-mode marshaling increases the bandwidth dedicated to performing a marshaling process, thereby allowing a controller to quickly marshal the transmitters. Within a TDMA network, a TDMA frame includes a header portion and a multi-channel portion. Each of the transmitters within a TDMA network transmits during an assigned time-slot of the TDMA frame. To marshal a transmitter, the transmitter is requested to transmit a ranging signal to a central controller. If the ranging signal is received during the header portion of the TDMA frame, the controller can accurately detect the ranging signal. However, for longer propagation delays, the length of the header is insufficient. Wide-mode marshaling resolves this by silencing some or all of the transmitters to increase the bandwidth for receiving the ranging signal.

12 Claims, 8 Drawing Sheets

MULTI-NODE HFC DIVERSE ROUTE RECOVERY ALGORITHM USING MULTI-STAGE, WIDE-MODE MARSHAL WITH BRANCH FAILURE DETECTION

TECHNICAL FIELD

This invention relates to the field of network communications and, more particularly, relates to synchronizing transmitters within a communications network, such as a cable telephony network, when one or more of the transmitters have fallen out of synchronization.

BACKGROUND

The wide-spread availability of hybrid fiber/coaxial ("HFC") networks, along with the broadband nature of the HFC networks, are allowing new and improved services to be brought into the home and/or office of consumers. Services that have traditionally been provided via other mediums, such as local telephone service and Internet access, are now available through HFC networks that are owned, operated, and/or utilized by cable operators.

The provision of local telephone service through HFC networks is rapidly expanding. Large multiple systems operators in the United States are achieving penetration rates of 10 to 20 percent of homes passed with more than 95 percent of acquired subscribers dropping their old carrier in favor of the cable operator. Today, more than 200,000 lines of telephone service are provided by means of HFC around the world, with more than 40,000 of these lines being in the United States.

Local telephone service provided through an HFC network has several advantages over the traditional analog loop provided via copper wiring. One such advantage is that unlike the analog loop, HFC provisioned telephone service is not as susceptible to cross-talk, electrical noise, inductance capacitance, lightning and power cross. In addition, the voice quality provided by use of an HFC network is improved over that of a copper analog loop by improving the effect of jitter, attenuation distortion and other key voice quality parameters.

Traditional telephone service over the PSTN and local-loops has achieved a high-level of reliability and availability. The provisioning of traditional services over an HFC network has not been held to the high standards that have come to be expected for the provisioning of telephone service. However, to be a competitive and viable service, the cable operators have had to identify technical problems undermining the reliability and availability of telephone service through an HFC network and then resolve these technical problems.

One such technical problem that has not been fully addressed and resolved to date is maintaining the synchronization of transmitting devices within an HFC network, especially when network errors occur. In an HFC telephone network, a network interface unit ("NIU"), also referred to as VOICEPORT or a CPE, interfaces between subscriber equipment and the rest of the HFC network. A host digital terminal ("HDT") interfaces the HFC network to the public switched telephone network ("PSTN"). The HDT also operates as a controller for each of the NIU's. In operation, the NIU's transmit in a time-division-multiple-access format under the control of the HDT. For instance, the HDT assigns time-slots to each of the NIU's. When the topology of the HFC network changes, such as when a fiber cable is severed and a redundant path is switched in, the propagation delays associated with the transmissions of one or more NIU's may be altered. This results in the aforementioned loss of synchronization for the transmitting devices on an HFC network.

Using existing technology, a long, cumbersome process is required to overcome a loss of synchronization of the transmitting devices on an HFC network. This process can take on the order of 30 to 45 minutes, if it can be resolved at all. This amount of time is not acceptable to typical consumers because it is way below the standards offered by traditional telephony networks. Therefore, there is a need in the art for a system and method to detect and alleviate transmission synchronization problems within an HFC network and thereby reduce service outages following an HFC route switch.

One technique that has been used to recover transmitters after a route switch is to use a TDMA search algorithm. The TDMA search algorithm measures propagation delays of transmitters by examining the time delay of their responses when prompted to transmit a pulse at the start of a TDMA frame. In this type of system, the transmitted pulses fall within the header portion of the TDMA frame. However, for larger networks, this technique fails. One cause of this failure is that the propagation delay may be so large that the transmitted pulse will fall within the channel space of the TDMA frame. The large propagation delays result in corrupting the data and making it difficult for the pulse to be detected. In addition, as the size of the network increases, the TDMA search algorithm is too slow. Therefore, it is clear that there is a need in the art for a system and a method of timely recovering transmitters within a large network.

SUMMARY OF THE INVENTION

The present invention solves the above-described problems by providing a system and method for detecting synchronization failures of transmitters within a network, and quickly re-synchronizing the transmitters. Generally described, the present invention provides a method for synchronizing transmitters within a network by placing some or all of transmitters into a silent mode and enabling wide-mode marshaling. Once the transmitters are silenced, selected transmitters may be ranged or marshaled. After the selected transmitters have been marshaled, the transmitters are removed from the silent mode and normal operation is resumed. Advantageously, this solution allows recovery of transmitters even having very large propagation delays.

In one embodiment, the present invention operates within a synchronous transmission network, such as a time-division-multiple-access network. In this embodiment, the transmitters are ranged by first requesting a transmitter to transmit a ranging signal at a particular time. When the signal is received, the propagation delay associated with the signal traveling from the transmitter is determined. With this information, the timing is adjusted to synchronize transmissions.

More specifically, the present invention may be embodied within a synchronous network, such as a TDMA network, including a controller and multiple transmitters interconnected to the controller through a communications path. In one embodiment, the communications path may comprise a hybrid fiber/coaxial network with at least one portion of the network including redundant communication paths. Typically, only one of the communication paths will be active at a given time. The propagation delay associated with the various redundant communication paths will vary. Thus, if one of the communications paths is damaged and an alternate path is utilized, the differing propagation delays may result in losing synchronization within the system.

In operation within a TDMA network, the controller assigns each transmitter to a particular time-slot or channel. Alternatively, each transmitter may include a hard-coded time-slot assignment, or some other technique may be used to allocate time-slots to the transmitters. During operation, the controller detects when one of the transmitters is not transmitting in the assigned time-slot, or is out of synchronization. If this failure is due to a redundant path switch or protection switch over, it is highly probable that several or all transmitters will be out of synchronization. When the number of transmitters that are out of synchronization exceed a threshold amount, the controller will enable wide-mode marshaling. During wide-mode marshaling, some or all of the transmitters are silenced to allow the controller to properly marshal each of the transmitters. During the marshaling process, the controller selects one of the transmitters that is out of synchronization and attempts to perform a range operation on this transmitter. If the range operation fails, the controller will disable wide-mode marshaling. However, if the range operation is successful, the controller will select another one of the transmitters that is out of synchronization and attempt to perform a range operation on this transmitter. This process will be repeated until all of the transmitters are synchronized.

In an exemplary embodiment of the present invention, the controller performs the ranging operation or the marshaling process by first requesting a transmitter to transmit a ranging signal at a particular time $t_0$. The controller will receive the ranging signal at time $t_1$. The difference between time $t_1$ and time $t_0$ represents the propagation delay between the transmitter and the controller. The controller will then send an adjustment command to the transmitter so that all future transmissions by the transmitter will arrive at the correct time.

One aspect of the present invention is the employment of wide-mode marshaling. During the ranging operation, the controller expects to receive the ranging signal from the transmitter within the header portion of a TDMA frame. However, under certain conditions, the propagation delay may exceed the amount of time allocated to the header portion of the TDMA frame or may even arrive prior to the start of the header portion of the TDMA frame. Wide-mode marshaling allows additional time, beyond the time allocated for the header, to receive the ranging signal. One technique to accomplish this is to disable all of the transmitters during wide-mode marshaling. Using this technique, the entire TDMA frame is available for marshaling. In another technique, the transmitters will be prohibited from transmitting within the channels of the TDMA frame that are adjacent to the header. This technique allows additional portions of the TDMA frame to be available for marshaling without totally disabling the operation of the HFC network. In yet another technique, certain TDMA frames may be used as dedicated marshaling frames during wide-mode marshaling. For instance, every other frame may be used as a marshaling frame and the transmitters will be restricted from transmitting within those frames. Thus, the use of wide-mode marshaling within the present invention greatly improves the ability to maintain synchronization within a network.

Another aspect of the present invention is the use of multi-stage marshaling. A controller invokes the first stage marshaling procedure when it detects that the number of failed transmitters is greater than a first threshold. The first stage processing includes disabling the transmitters within the network and sequentially marshaling the failed transmitters. If the first transmitter is recovered, the controller marshals each of the remaining transmitters and then re-enables the transmitters. If the first transmitter is not recovered, the controller assumes the failure is due to a branch failure and the controller re-enables the transmitters. However, if the number of failed transmitters is greater than a second threshold, the controller will invoke the second stage marshaling procedure. In the second stage, the controller will disable the transmitters and attempt to marshal an alternate transmitter. This aspect of the present invention minimizes the impact to voice quality experienced on the network when only a single branch of the network has failed.

If the number of failed transmitters exceeds a third threshold, the controller will invoke the third stage marshaling procedure. The third stage is generally reserved for network wide errors in which large numbers of the transmitters have failed.

Yet, another aspect of the present invention is to enable or disable wide-mode marshaling based on the topology of the network. For instance, if no alternate paths are deployed, or the range differential between primary and secondary fiber routes is less than 10 kilometers, wide-mode marshaling is disabled. Advantageously, within a small network, this can improve performance of the network.

These and other aspects, features, and advantages of the present invention will be more clearly understood and appreciated from a review of the following detailed description of the present invention and possible embodiments thereof, and by reference to the appended drawings and claims.

DETAILED DESCRIPTION OF THE INVENTION

The present invention includes a system and a method for synchronizing transmitters within a communications network. Although the present invention will be described within the context of a cable telephony system over an HFC network, it will be appreciated by those skilled in the art, that the various aspects of the present invention may also be utilized within other contexts that require synchronized transmission of remotely located transmitter devices. In general, an exemplary embodiment of present invention may reside within a controller that interfaces with multiple transmitters within a communications network. In the exemplary embodiment, the communications network includes alternate transmission paths. The controller monitors the transmission characteristics of each of the transmitters to verify that they are capable of transmitting at an assigned time (i.e., are synchronized). If an error or a failure occurs within the network, multiple transmitters may fall out of synchronization. When this occurs, the controller will send out a silent command to each of the transmitters. Upon receiving the silent command, the transmitters will cease transmitting unless otherwise instructed by the controller. The controller may then perform a ranging operation on the transmitters that are not synchronized. Once the ranging operation is complete, the controller can re-enable the transmitters and resume normal operation. Advantageously, this method of synchronizing the transmitters can be performed very quickly, thereby minimizing the downtime of the network.

Figure 1:
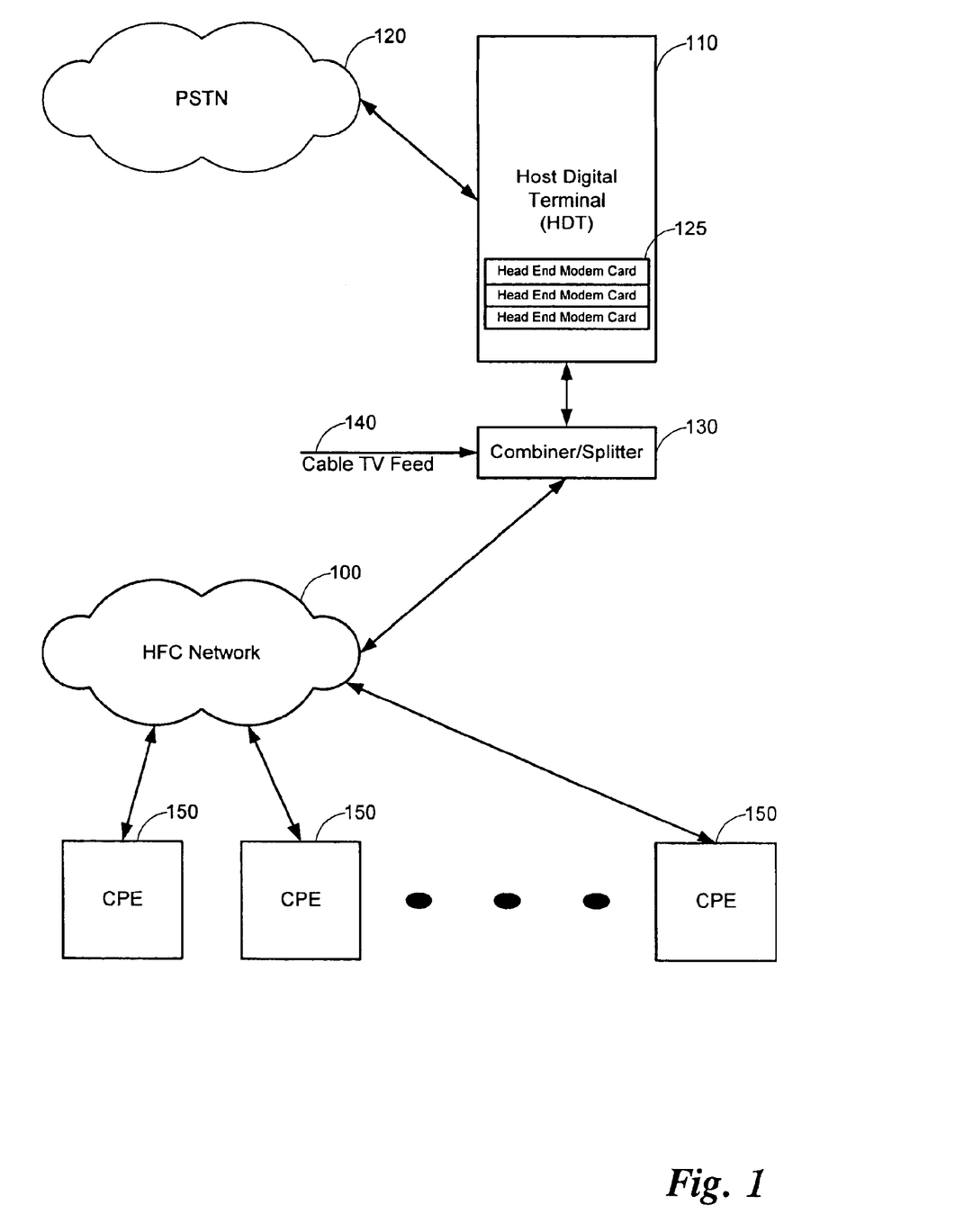
FIG. 1 is a system diagram of an exemplary environment suitable for various embodiments of the present invention.

Turning now to the figures in which like numerals and labels refer to like elements throughout the several views, various embodiments and various aspects of the present invention will be described in more detail. FIG. 1 is a system diagram of an exemplary environment suitable for various embodiments of the present invention. The exemplary environment includes a Hybrid Fiber/Coaxial ("HFC") network 100 with the components necessary to provide cable telephony service. A Host Digital Terminal ("HDT") 110 operates as the central controller of the HFC network 100. Among other tasks and capabilities, the HDT 110 interfaces the HFC network 100 to the Public Switched Telephone Network ("PSTN") 120. The interface between the HDT 110 and the PSTN 120 may be implemented in a variety of techniques with one such exemplary technique including a TI connection to a DMS 100 switch such as those available from Nortel Networks, Inc. The HDT 110 includes one or more head end modem cards ("modem") 125. A modem 125 converts digital data received via the HFC network 100 to the format necessary to interface to the PSTN 120, and converts data received via the PSTN 120 to the format necessary within the HFC network 100. If the HFC network 100 provisions both cable television and telephony service, a Combiner/Splitter 130 may be utilized to combine the cable television signals received from a Cable TV Feed 140 and the telephony signals received from the PSTN 120 via the HDT 110. Likewise, the Combiner/Splitter 130 is used to receive combined signals from the HFC network 100, separate out the telephony signals and route them to the HDT 110. Finally, telephony signals are delivered to multiple CPE devices 150. A CPE device 150 provides the subscriber equipment interface to telephony equipment within a home or office. It should be understood by those skilled in the art that this exemplary environment is only provided to illustrate the operation of the present invention and that the present invention is not limited in any way to operate only within this exemplary embodiment. Those skilled in the art will also appreciate that the present invention is not limited to operation over an HFC network, but rather, that the present invention is applicable to a variety of network types. In fact, the present invention may be utilized in a variety of synchronous transmission systems performing a variety of communications services.

Figure 2:
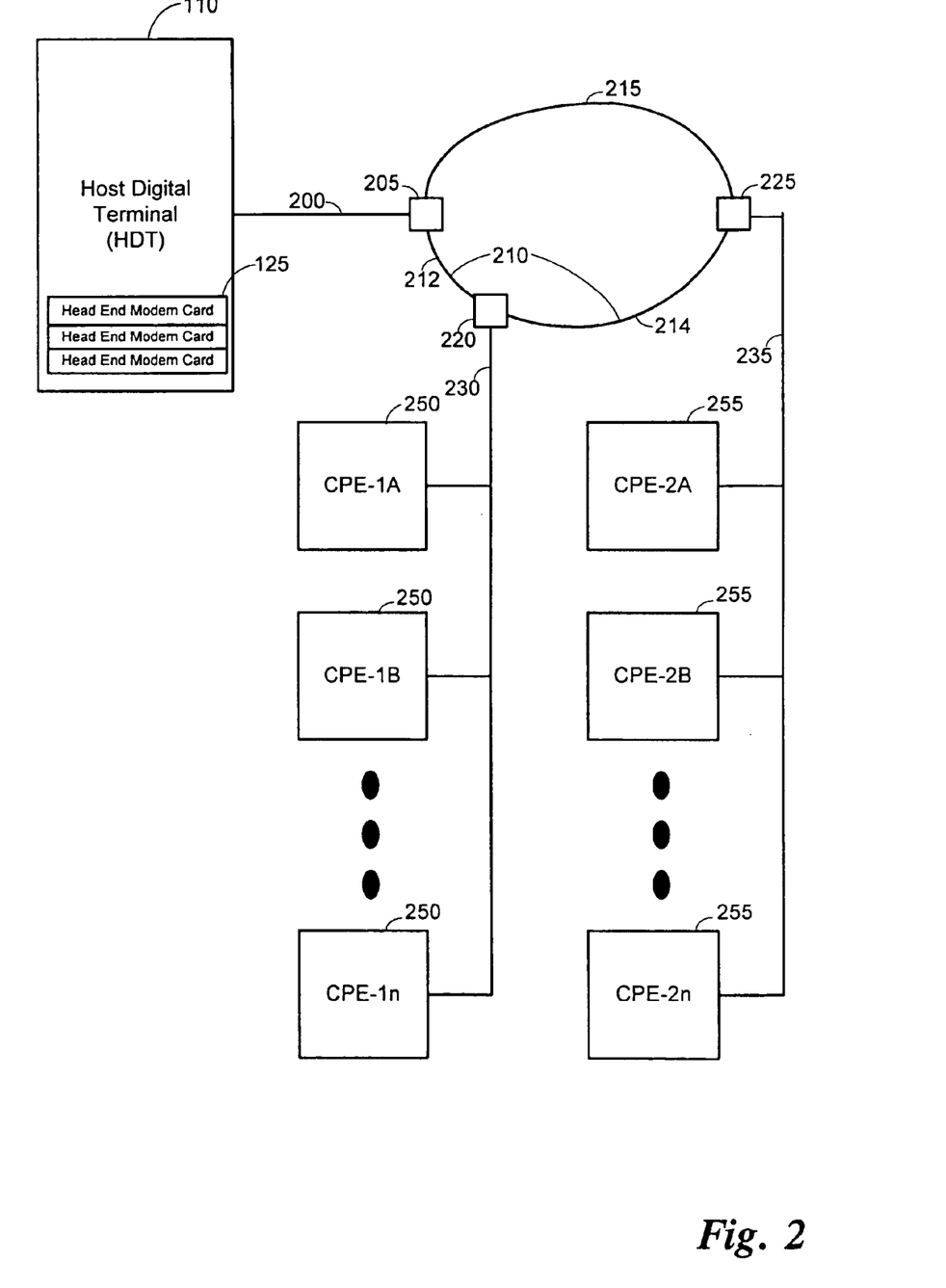
FIG. 2 is a system diagram illustrating a simple application of an exemplary embodiment of the present invention.

FIG. 2 is a system diagram illustrating a simple application of an exemplary embodiment of the present invention.

In this embodiment, the HDT 110 interfaces over a main coaxial feed 200 to a first transducer 205. The transducer is used to interface coaxial feeds to fiber optic feeds and to perform the necessary signal translation between the two mediums. The first transducer 205 interfaces the main coaxial feed 200 to a primary fiber optic feed 210 and secondary fiber optic feed 215. The primary fiber optic feed 210 also interfaces to a second transducer 220 and a third transducer 225. The second transducer 220 and the third transducer 225 convert optical signals received via the primary fiber optic feed 210 into radio frequency signals suitable for transmission over first subscriber coaxial feed 230 and a second subscriber coaxial feed 235 respectively. The first subscriber coaxial feed 230 interfaces with a first set of CPE devices 250. The individual CPE devices in this first set of CPE devices 250, are labeled as CPE-1A, CPE-1B, . . . CPE-1n. The second subscriber coaxial feed 235 interfaces with a second set of CPE devices 255. The individual CPE devices in this second set of CPE devices 255 are labeled as CPE-2A, CPE-2B, . . . CPE-2n. Alternatively, the subscriber coaxial feeds may interface with a tap that supports multiple CPE devices. The secondary fiber optic feed 215 provides an alternate or backup transmission path between the first transducer 205 and the third transducer 225.

In operation, the primary fiber optic feed 210 is active for carrying telephony signals between the CPE devices and the HDT 110. Telephony signals are routed from the HDT 110 to the first set of CPE devices 250 over a path that includes the main coaxial feed 200, the first transducer 205, a first portion 212 of the primary fiber optic feed 210, the second transducer 220 and the first subscriber coaxial feed 230. Telephony signals are routed from the HDT 110 to the second set of CPE devices 255 over a path that includes the main coaxial feed 200, the first transducer 205, the entire primary fiber optic feed 210, the third transducer 225 and the second subscriber coaxial feed 235.

Figure 3A:
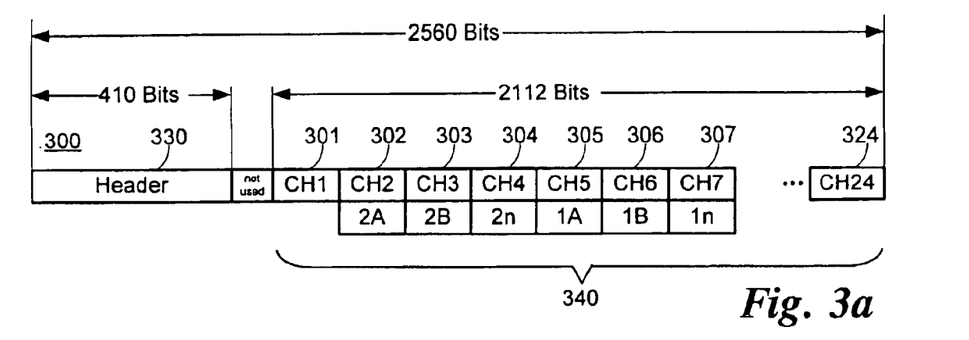
FIG. 3a is a timing diagram illustrating the operation of the system of FIG. 2 when the transmissions are synchronized.

In an exemplary embodiment of the present invention, the telephony signals are transmitted through the HFC network as QPSK modulated signals formatted within a twenty-four channel TDMA frame. Those skilled in the art will appreciate that the present invention is not limited to this particular signaling scheme, but rather, that the present invention may also be used in conjunction with a wide variety of modulation schemes and data transmission protocols. FIG. 3a is a timing diagram illustrating the operation of the system of FIG. 2 when the transmitters are synchronized. A single TDMA frame 300 is illustrated. The TDMA frame includes a header portion 330 and a data portion 340. The data portion 340 is divided into twenty-four TDMA channels 301, 302, 303, . . . 324. The HDT 110 controls the assignment of the channels to the various CPE devices. For instance, if a telephone call is initiated on CPE-1A, the HDT 110 will look for an available channel within the TDMA frame and assign this channel to CPE-1A. Other techniques may also be used to control, allocate, and monitor the usage of the TDMA channels and the present invention is not limited to any particular technique. In the example provided, the following channel assignments have been made:

CPE-1A is assigned to TDMA channel 5 305;
CPE-1B is assigned to TDMA channel 6 306;
CPE-1n is assigned to TDMA channel 7 307;
CPE-2A is assigned to TDMA channel 2 302;
CPE-2B is assigned to TDMA channel 3 303; and
CPE-2n is assigned to TDMA channel 4 304.

The length and conductivity of the fiber optic cable and coaxial cable paths between each of the CPE devices and the HDT 110 may vary. The varied length of these transmission paths make it difficult to ensure that the transmissions from each CPE device arrive at the HDT 110 in the correct channel timing. Thus, the CPE furthest away from the modem 125 must transmit earlier than the CPE nearest the modem 125 to ensure that both signals arrive at the modem 125 at the appropriate time. For instance, it is well know that the velocity of a transmission medium ("v") is equal to the speed of light in a vacuum ("c") divided by the index of refraction ("n"), or v=c/n. For a single mode fiber having an index of refraction of 1.47 or 68.1%, the velocity of the medium would be:

v=(3.0e8 m/s) 0.681)=2.043e8 m/s.

Assuming that an entire TDMA frame is 2560 bits long (410 bits of header, 38 unused bits and 24 88 bit channels) and the transmission speed is 1000 frames/second, the bit distance for this example can be calculated as:

bit distance=v/bit-rate=(2.043e8 m/s)/(2.56e6 bits/s)= 79.8 m/bit. Further, the delay from a downstream frame pulse from an HDT to when the CPE transmission is received is half the round-trip distance or (79.8 n/bit)/ 2=39.9 m/bit. Thus, a distance change of 40 meters in the fiber optic feed would result in shifting a transmission by a CPE device one bit position.

Using this example, assume that the length of the first portion 212 of the primary fiber optic feed 210 is 20 kilometers and the length of the second portion 214 is 30 kilometers. In this example, data traveling from the third transducer 225 will travel 50 kilometers to arrive at the first transducer 205, whereas data traveling from the second transducer 220 will travel 20 kilometers. Assuming the delay due to the main coaxial feed 200 is equivalent to 80 meters of the single mode fiber, the propagation delay from the second transducer 220 to the HDT 110 is 502 bit-times. The propagation delay from the third transducer 225 to the HDT 110 is 1252 bit times. In addition, each of the CPE devices are located a different distance from their respective transducers. Assuming that each CPE device is an increment of the equivalent of 40 meters of the single mode fiber away from the transducer, the propagation delay from each of the CPE devices in FIG. 3 to the HDT 110 is:

| CPE | Bit-times |
|---|---|
| CPE-1A | 503 |
| CPE-1B | 504 |
| CPE-1C | 505 |
| CPE-2A | 1253 |
| CPE-2B | 1254 |
| CPE-2C | 1255 |

To ensure that the data from each of the CPE devices arrives at the HDT 110 at the appropriate time, it is necessary to marshal or range each of the CPE devices. The ranging operation generally involves identifying the propagation delay associated with a CPE device and adjusting the transmission timing of the CPE device accordingly. Thus, for CPE-1A, the HDT 110 would provide a propagation delay message of 503 bit times. With CPE-1A being assigned to TDMA channel 5 305, CPE-1A would then transmit its data 503 bit times prior to the time that the data for TDMA channel 5 305 is due to arrive at the HDT 110.

Figure 3B:
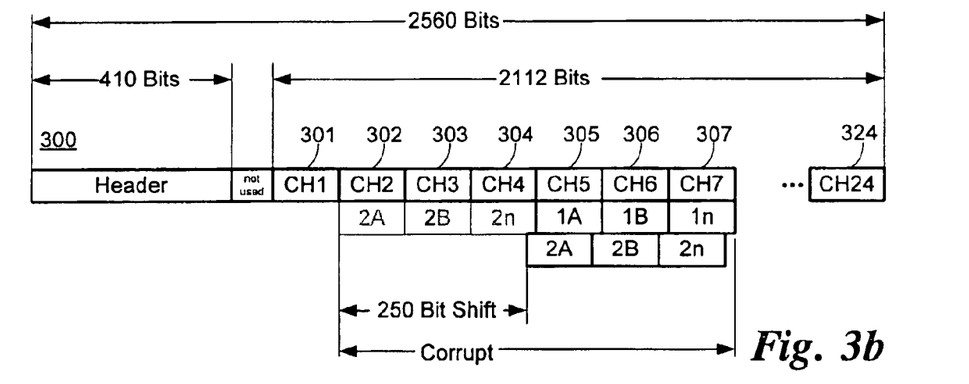
FIG. 3b is a timing diagram illustrating the operation of a system of FIG. 2 under a failure mode.

FIG. 3b is a timing diagram illustrating the operation of a system of FIG. 2 under a failure mode. If the primary fiber optic feed 210 in FIG. 3 is severed at portion 214, the data from the third transducer 225 must be routed over the secondary fiber feed 215. If the propagation delay associated with the secondary fiber feed 215 is the same as that for the primary fiber optic feed 210, then no problems will occur. However, the more likely scenario is that the length of the secondary fiber optic feed 215 will be significantly different. Assuming that the secondary fiber optic feed 215 is 60 kilometers (10 kilometers longer than the main fiber optic feed 210), the data from the third transducer 225 would be subject to an additional 250 bit times causing the failure mode of FIG. 3b to occur. In this failure mode, the data transmissions on the TDMA channels 2–7 (302–307) will be corrupted.

Figure 3C:
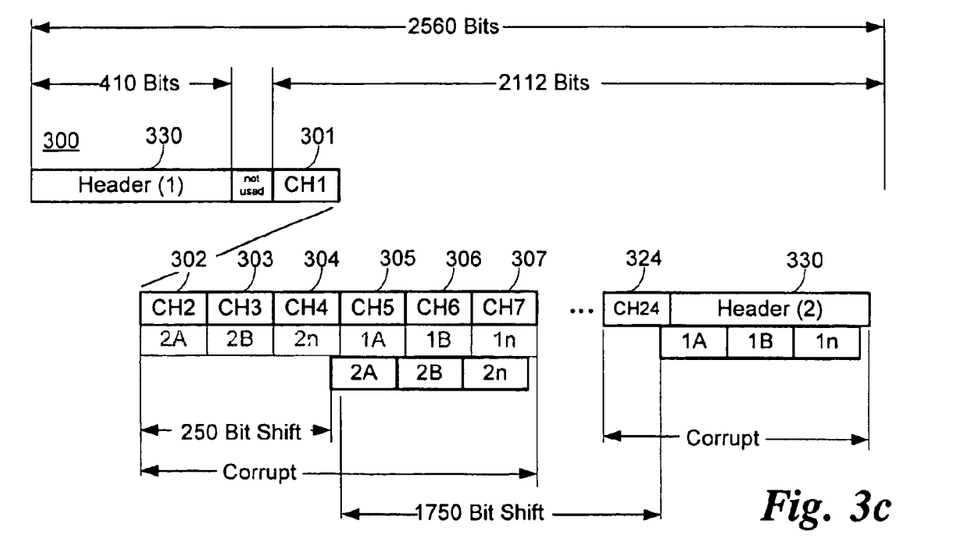
FIG. 3c is a timing diagram illustrating the operation of the system of FIG. 2 under another failure mode.

FIG. 3c is a timing diagram illustrating the operation of the system of FIG. 2 under another failure mode. Under this situation, the first portion 212 of the primary fiber optic feed 210 is severed. This results in changing the path between the second transducer 220 and the first transducer 205 to include the second portion 214 of the primary fiber optic feed 210 and the secondary fiber optic feed 215. In this situation, the data from the second transducer 220 will have to travel an additional 70 kilometers causing an additional 1750 bit-time propagation delay. The data from the third transducer 225 will be delayed the same amount as illustrated in FIG. 3b. In this failure mode, the data transmitted in TDMA channels 2–7 (302–307), 24 (324), as well as the header portion of the next TDMA frame will be corrupted.

Figure 4:
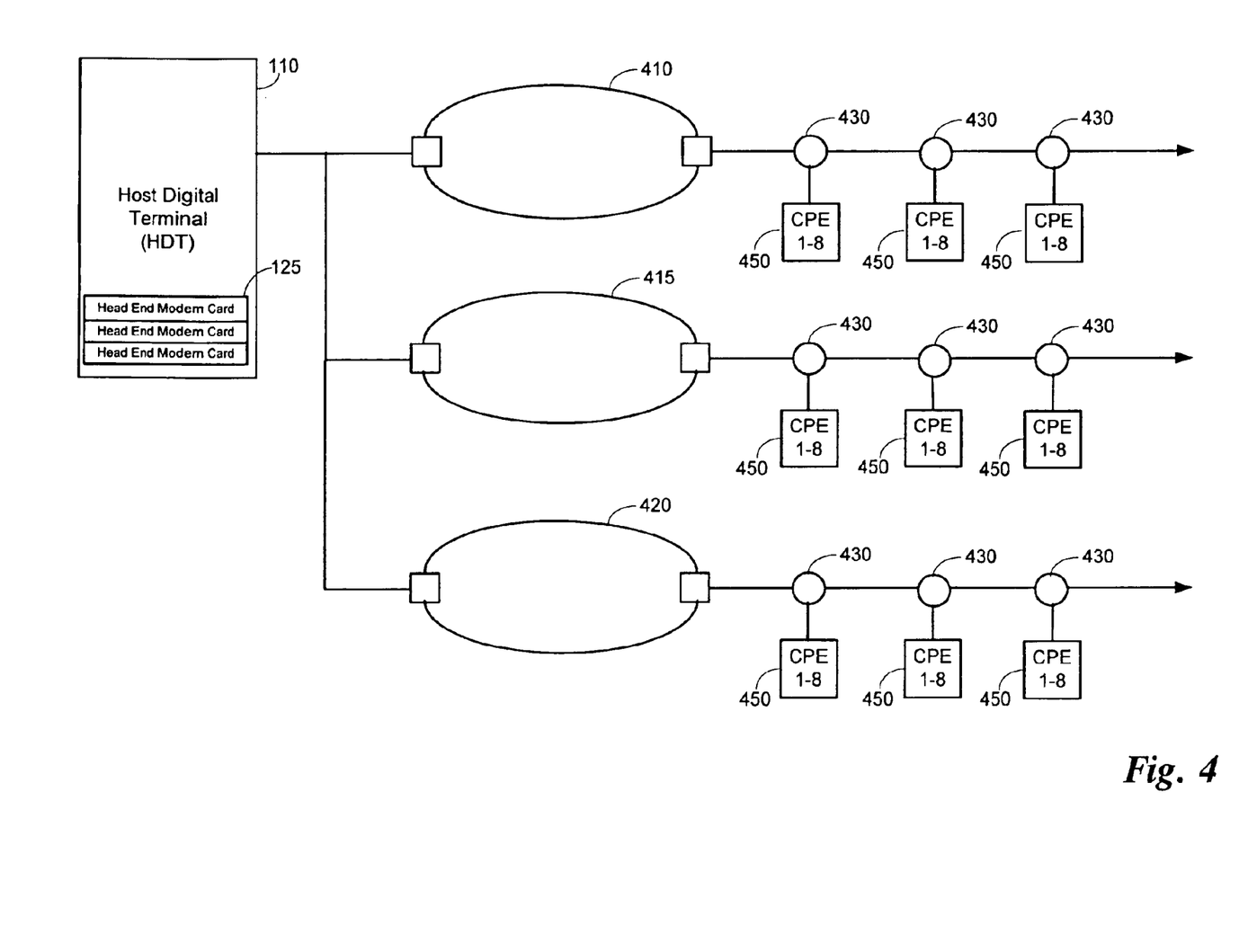
FIG. 4 is a system diagram illustrating a complex application of an exemplary embodiment of the present invention.

In either of the failure conditions depicted in FIGS. 3b and 3c, the present invention may be used to re-synchronize the transmitters. Additional failure conditions may also be identified and the present invention may be used to re-synchronize the transmitters under these additional failure conditions as well. FIG. 4 is a system diagram illustrating a complex application of an exemplary embodiment of the present invention. In this embodiment, multiple fiber optic loops are shown (410, 415, 420) with taps 430 hanging off of the loops. In an exemplary telephony cable system, a tap 430 will support eight CPE devices 450. However, depending on the types of taps and the CPE devices utilized, other configurations could also exist and are anticipated by the present invention. Each modem 125 controls one or more of the CPE devices 450. However, the assignment of CPE devices 450 and modems 125 can be quite varied. For instance, a single modem 125 may control selected CPE devices 450 from each of the three illustrated fiber optic loops. Thus, the reader will conclude that many error situations may occur in such a highly complex network and that the propagation delays associated with the CPE devices controlled by a given modem 125 may vary greatly.

Figure 5:
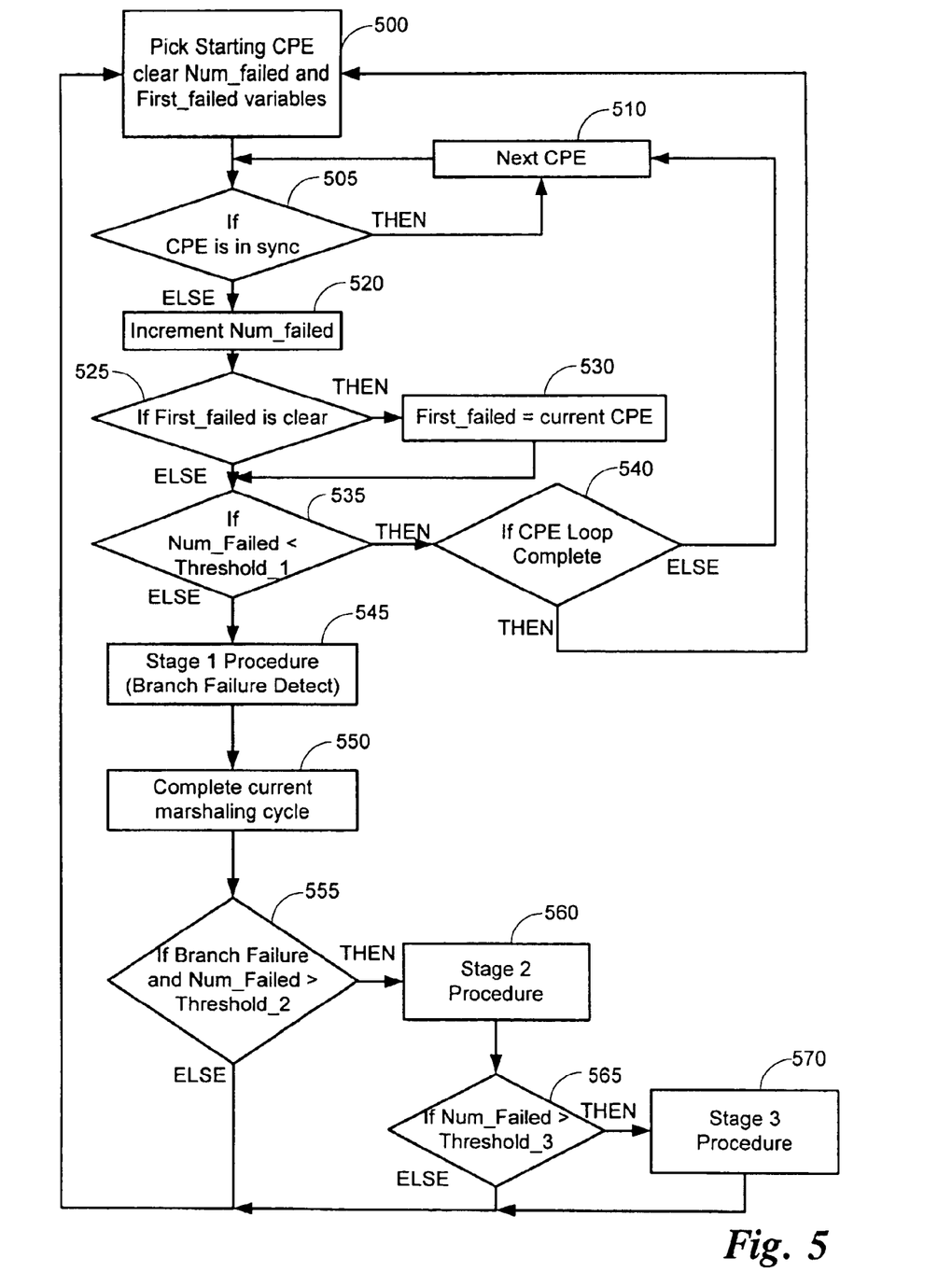
FIG. 5 is a flow diagram illustrating the steps involved in an exemplary implementation of the present invention.
Figure 6:
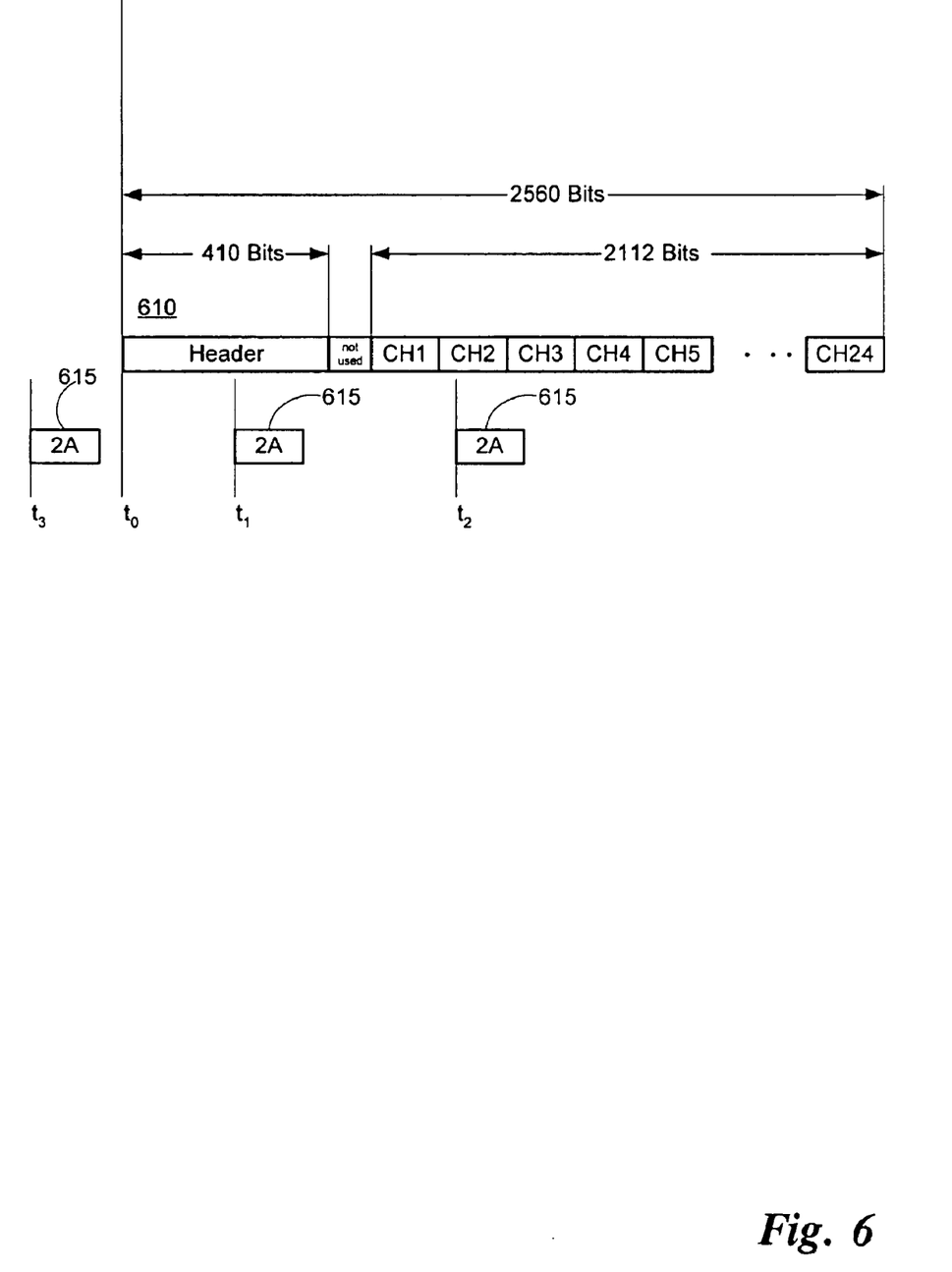
FIG. 6 is a timing diagram illustrating an exemplary pinging operation suitable for an exemplary embodiment of the present invention.

FIG. 5 is a flow diagram illustrating the steps involved in an exemplary implementation of the present invention. The process illustrated in FIG. 5 operates to synchronize the various CPE devices within a network. CPE devices 450 are maintained in a list in the modem 125 and checked in a continuous loop. At step 500, an arbitrary CPE 450 is selected from the list as the starting point for the continuous loop. In addition, processing variables such as the number of failed CPEs count ("Num_failed") and the variable identifying the first failed CPE ("First_failed") are cleared. At step 505, the first CPE is examined to determine if it is synchronized. This process involves the modem 125 pinging the CPE device. A ping is simply sending a signal to a device under test to prompt the device under test to respond with another signal. Thus, pinging a CPE device will allow the modem 125 to determine if the CPE device is operating properly. FIG. 6 is a timing diagram illustrating an exemplary pinging operation suitable for an exemplary embodiment of the present invention. The modem 125 sends a ping message to a particular CPE device. The ping message requests the receiving CPE device to transmit a response signal 615 at the beginning $t_0$ of the header portion of a subsequent, up-link TDMA frame (CPE to HDT) 610. The CPE device then transmits the requested signal 615. Point $t_0$ illustrates the time that the modem should receive the beginning of the header portion of a subsequent TDMA frame 610. For a perfectly synchronized CPE device, the transmitted pulse will be received by the modem 125 at time $t_0$. If the CPE device is not synchronized, the transmitted signal 615 may arrive at time $t_1$. If the CPE device is severely out of synchronization, the transmitted signal 615 may arrive at time $t_2$. This latter scenario would, at a minimum, result in corrupting the data in the channel region of the TDMA frame. The transmitted signal may also arrive at time $t_3$ which is prior to the time at which the signal is expected. To prevent erroneously concluding that this received signal is a severely late signal, frame numbers can be used to distinguish this category of response timing from the former. Alternatively, an adjustment to the CPE transmitter timing can be made and the direction of movement of the timing of the received signal can be observed.

If at step 505, it is determined that the first CPE is synchronized, processing continues at step 510 where the next CPE is selected. As long as all of the CPE's are synchronized, the loop consisting of steps 505 and 510 will be continuously repeated and the list of CPE's will be continuously cycled through. However, if a CPE is not synchronized, processing will continue at step 520. At step 520, the Num_failed variable is incremented to indicate that the process has detected that a CPE is out of synchronization. Processing then continues at step 525 where the First_failed variable is examined. If the First_failed variable has not been set (i.e., is clear), then the current CPE is identified as the first failed CPE at step 530 and processing continues at step 535. Marking the first failed CPE indicates the start of a marshaling cycle. At step 525, if the First_failed variable has previously been set to a CPE, then processing continues at step 535.

At step 535, the Num_failed variable is compared to a first threshold value ("Threshold_1"). If the Num_failed variable exceeds the Threshold_1, the processing continues at step 545 where the Stage 1 procedure is invoked. Otherwise, processing continues at step 540. At step 540, if the CPE loop has not been completed (i.e., the current CPE being examined is not the same as the First_failed CPE, then processing continues at step 510 where the next CPE is selected. Otherwise, processing returns to step 500.

At step 545, the stage 1 procedure is invoked. The stage 1 procedure can end under one of two circumstances. Under the first circumstance, all of the CPE devices will be re-synchronized. Under the second circumstance, an attempt to re-synchronize one or more of the CPE devices fails. This second circumstance indicates a branch failure within the network has occurred and the marshaling process will not be able to recover the CPE devices attached to this branch. A branch failure is a situation in which one or more CPE devices are severed from the network and an alternate path is not available. Advantageously, this embodiment of the present invention allows for the recovery of CPE devices in a timely fashion. As soon as the Threshold_1 number of failed CPE devices is reached, the stage 1 procedure is immediately invoked.

After the completion of the stage 1 procedure at step 545, processing continues at step 550. At step 550 if the marshaling cycle is not complete (i.e., not all of the CPE devices have been examined), then the remaining CPE devices are examined to conclude the marshaling cycle. Upon completion of the marshaling cycle, processing continues at step 555. At step 555, if the stage 1 procedure did not result in a branch failure detection, processing returns to step 500 to repeat the entire process. However, if the stage 1 procedure results in a branch failure detection and the Num_failed variable is greater than a second threshold value ("Threshold_2"), the stage 2 procedure is invoked in step 560. After the completion of the stage 2 procedure, the value of the Num_failed variable is compared to a third threshold value at step 565. If the value of the Num_failed variable is greater Threshold_3, the stage 3 procedure is invoked at step 570. Otherwise, processing returns to step 500.

It is important to note that the Threshold_1 number of failed CPE devices must be reached in one marshaling cycle to invoke the stage 1 procedure. If a branch failure has been detected, the current marshal cycle will not be ended but instead will be completed and then compared to the Threshold_2 and Threshold_3 values. Threshold_2 and/or Threshold_3 must be reached in this continued marshal cycle after a branch failure has been detected in order to invoke the stage 2 and stage 3 procedures.

In one embodiment, Threshold_1 may be set to a value of nine. In this embodiment, each of the taps 430 show in FIG. 4 support eight CPE devices. Thus, selecting nine as a threshold operates to prevent invoking the Stage-1 procedure as the result of a single tap failure. Those skilled in the art will appreciate that the first integrity threshold may be set to any of a variety of levels and that the best method to select the appropriate level is to intrinsically evaluate the operation of a particular network and the present invention at different levels.

Figure 7:
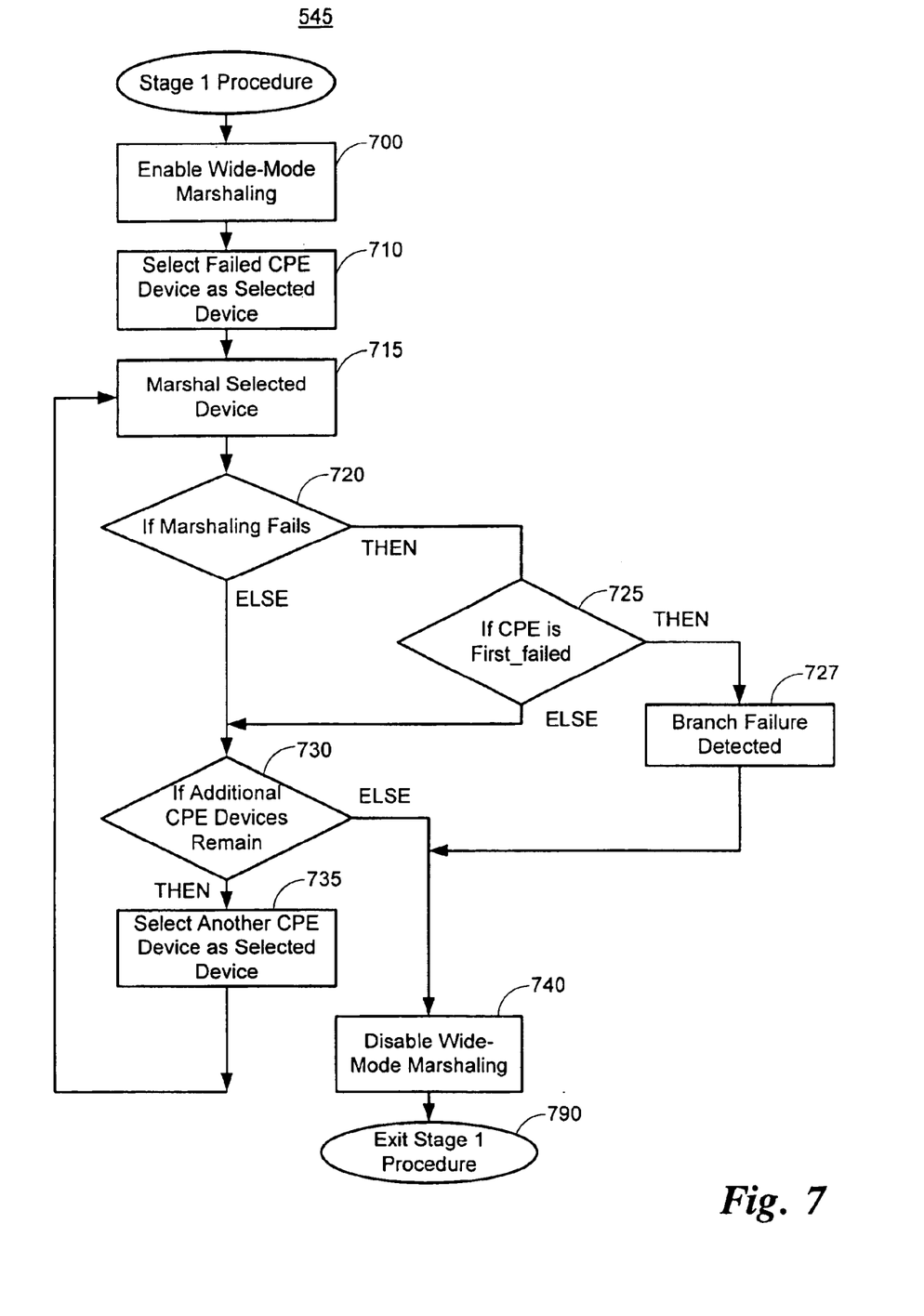
FIG. 7 is a flow diagram illustrating the details of the Stage-1 procedure aspect of the present invention.

FIG. 7 is a flow diagram illustrating the details of the Stage-1 recovery procedure. Processing for the Stage-1 recovery procedure begins at step 700 where wide-mode marshaling is enabled. Marshaling or ranging is a process where the modem 125 sends a ping to a CPE device, receives the response from the CPE device, and adjusts the transmission delay of the CPE device, if necessary, based at least in part on the characteristics of the response. Typically, the response from the CPE devices will fall within the header region of the received TDMA frame. However, as illustrated in FIG. 6, under certain situations, the response from a CPE device may fall within the channel area of the TDMA frame. When the response from a CPE device does fall within the channel area of the TDMA frame, some of the data within the TDMA frame is corrupted and the modem 125 cannot properly detect the response. To alleviate this problem, one aspect of the present invention is to utilize wide-mode marshaling. In general, wide-mode marshaling involves silencing the transmitters of some or all of the CPE devices to allow the modem 125 to detect the response from the CPE devices. In one embodiment of the present invention, all of the CPE devices that are controlled by a single modem 125 may be disabled. Thus, in a typical network in which the modem 125 controls the operation of 120 CPE devices, the transmitters of all 120 of the CPE devices would be disabled. In another embodiment of the present invention, only a subset of the CPE devices may be disabled. In this embodiment, the modem disables the transmitters of the CPE devices that utilize the lower channels (i.e., on the channel 1 end of the channel range). In yet another embodiment of the present invention, the modem 125 does not disable the transmitters of the CPE devices, but rather, limits the channels within the TDMA frame that may be used for transmitting. For instance, during wide-mode marshaling, the CPE devices may be required to share only the upper channels of the TDMA frame (i.e., on the channel 24 end of the channel range). Regardless of the method selected, the wide-mode marshaling process allows the modem 125 to receive the responses from the CPE devices regardless of whether the responses fall within the header region or the channel region of the received TDMA frame. After enabling wide-mode marshaling, processing continues at step 710.

At step 710, one of the non-synchronized CPE devices is selected for marshaling. In one embodiment of the present invention, the modem 125 will select the first failed CPE device detected during the search loop. However, in other embodiments, the modem 125 may select the CPE devices in some other predetermined or random order. Once the modem 125 selects a CPE device, processing continues at step 715.

At step 715, marshaling or the ranging operation is performed on the selected CPE device. In the marshaling process, the modem 125 requests the selected CPE device to transmit a pulse or a response signal. In response to receiving the transmitted pulse, the modem 125 can calculate the propagation delay between the CPE device and the modem 125. Referring again to FIG. 6, if the modem 125 receives the response from the CPE device at time $t_1$, then the modem 125 will request the CPE device to modify its transmission delay by $t_1-t_0$. Similarly, if the modem 125 receives the response from the CPE device at time $t_2$, then the modem 125 will request the CPE device to modify its transmission delay by $t_2-t_0$. The marshaling process is successful if the CPE accepts the new delay and a subsequent ping results in the modem 125 receiving the response from the CPE device at time $t_0$. However, if the marshaling process fails, then the initial failure of the CPE device may be attributed to something other than a route switch. At step 720, if the marshaling process fails, processing continues at step 725. However, if the marshaling process is successful, processing continues at step 730.

At step 730, the marshaling process on the previously selected CPE device was successful. However, additional CPE devices may also require marshaling. If additional CPE devices remain to be marshaled, processing continues at step 735. Otherwise processing continues at step 740. At step 735, the modem selects the next CPE device and processing returns to step 715 with the newly selected CPE device.

At step 725, the process determines if the failed CPE is due to a branch failure. If a branch failure is detected (i.e., marshaling fails and the marshaling cycle has been completed), then processing continues with step 727 where a branch failure flag is set and step 740 where wide mode marshaling may be disabled. Ultimately, the process will return to step 550 prior to determining if the stage 2 procedure should be invoked at step 555. In one embodiment, the second integrity threshold is set to 75% of the controlled CPE devices. Thus, in a system where a single modem 125 controls 120 CPE devices, the second integrity threshold for this embodiment would be 90. However, those skilled in the art will appreciate that the second integrity threshold could be any of a variety of levels and that the best method to select the second integrity threshold level is to intrinsically evaluate the performance of the network at various threshold levels.

At step 740, the modem 125 disables wide-mode marshaling. The Stage-1 procedure is then exited at point 790.

Figure 8:
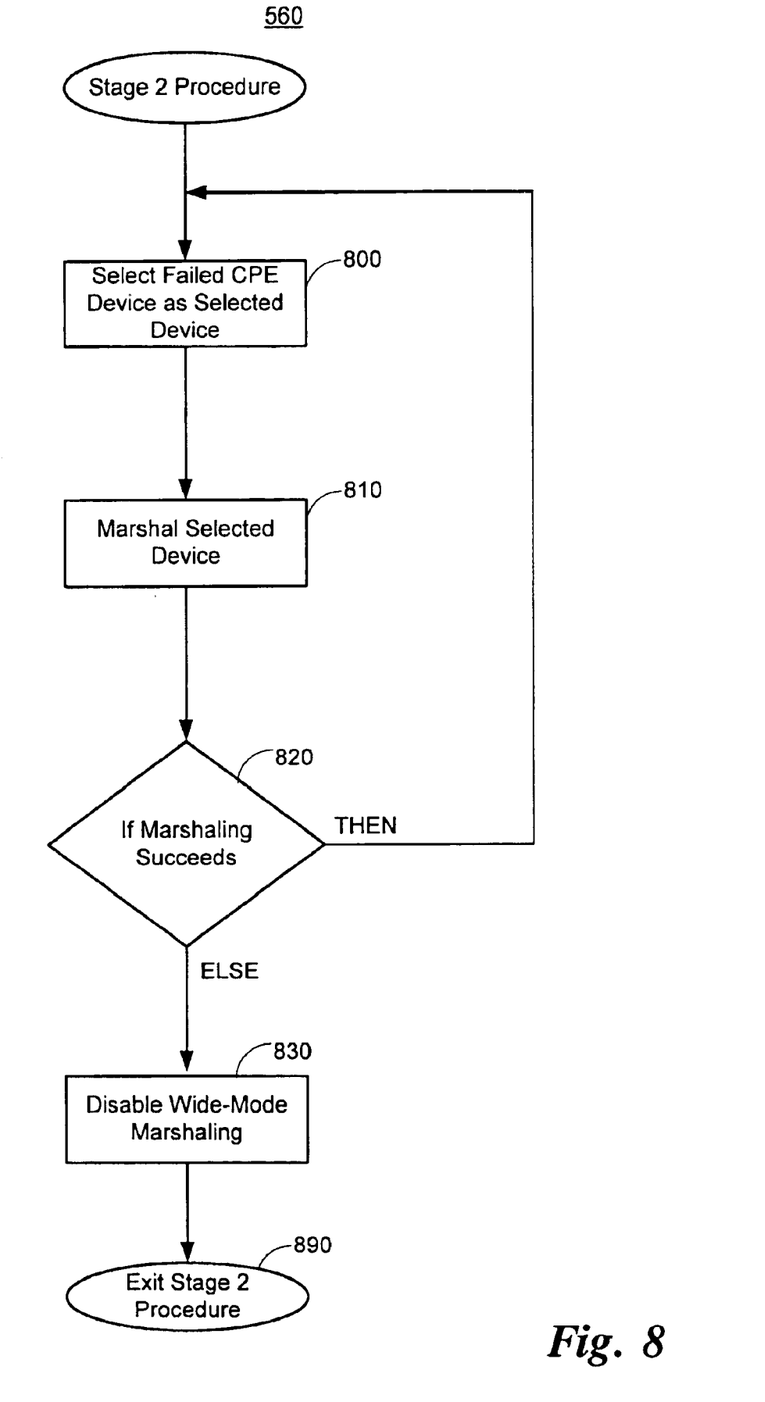
FIG. 8 is a flow diagram illustrating the details of the Stage-2 procedure aspect of the present invention.

FIG. 8 is a flow diagram illustrating the details of the Stage-2 recovery procedure 560. The stage-2 procedure begins at step 800 after an attempt to marshal a first failed CPE devices has failed. At step 800, the modem 125 selects a different failed CPE device to marshal. In general, the Stage-2 procedure is invoked when there is a large number of failed CPE devices. The Stage-2 procedure is invoked when the Stage-1 procedure results in the detection of a branch failure; however, the number of non-synchronized CPE devices indicate that additional problems in the network may exist. Once the next CPE device is selected, processing continues at step 810.

At step 810, the marshaling process is attempted on the next failed CPE device and then processing continues at step 820. At step 820, if the marshaling process succeeds, processing returns to step 800. Otherwise, at step 830 wide-mode marshaling is disabled and the Stage-2 procedure is exited at point 890. Processing then returns to step 500 of FIG. 5.

The Stage-3 procedure 550 is invoked when the number of failed CPE devices (Num_Failed) exceeds the third integrity threshold (Threshold_3). In one embodiment, the third integrity threshold is set to 100% of the CPE devices. Thus, in an embodiment in which the modem 125 controls 120 CPE devices, the third integrity threshold is set to 120. However, those skilled in the art will appreciate that the third integrity threshold could be any of a variety of levels and that the best method to select the third integrity threshold level is to intrinsically evaluate the performance of the network at various levels. In the Stage-3 procedure 550, wide-mode marshaling is enabled and the marshaling process is attempted on each of the CPE devices. Once the Stage-3 procedure 570 is completed, the modem 125 enables the transmitters of each of the CPE devices and processing returns to step 500 of FIG. 5.

The present invention has been described in relation to particular embodiments which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. A method for ranging transmitters within a network, the network including a controller and a plurality of transmitters communicatively coupled to the controller over a communications path and exchanging information using TDMA technology, the method comprising the steps of:

assigning a particular transmitter of the plurality of transmitters to a particular time-slot of a TDMA frame to facilitate communication between the particular transmitter and the controller;

performing a search loop on a first set of transmitters of the plurality of transmitters wherein the operation of each of the first set of transmitters is verified;

identifying each of the first set of transmitters that fail during the search loop as a failed transmitter;

if the number of failed transmitters exceeds a first integrity threshold, disabling the transmission of a second set of the transmitters of the plurality of transmitters;

performing a range attempt on a first failed transmitter;

if the range attempt fails, enabling the transmission of the second set of transmitters; and if the range attempt succeeds, performing a range attempt on a next failed transmitter until a range attempt has been performed on each failed transmitter or the range attempt fails, and then enable the transmission of the second set of transmitters.

2. The method of claim 1, wherein after the range attempt on a first failed transmitter fails and after enabling the transmission of the second set of transmitters, further comprising the steps of:

disabling the transmission of the second set of transmitters; and performing a range attempt on a next failed transmitter if the number of failed transmitters exceeds a second integrity threshold.

3. The method of claim 2, wherein the number of failed transmitters exceeds a third integrity threshold, further comprising the step of performing a range attempt on each of the failed transmitters.

4. The method of claim 2, wherein the number of failed transmitters exceeds a third integrity threshold, further comprising the step of performing a range attempt on each of the failed transmitters.

5. A computer-readable medium having computer executable instructions for performing the steps recited in claim 3.

6. A computer-readable medium having computer executable instructions for performing the steps recited in claim 4.

7. A communications network including:

a controller;

a plurality of transmitters;

a communications path communicatively coupling the controller to each of the plurality of transmitters;

the controller being operative to:

assign each of the plurality of transmitters to a particular time-slot;

perform a search loop on a first set of transmitters, the search loop allowing the controller to identify a failed set of transmitters of the plurality of transmitters, the failed set of transmitters being transmitters that are not transmitting in synchronization;

if the number of transmitters in the failed set of transmitters exceeds a first integrity threshold, perform a first recovery process and, if the first recovery process aborts and the number of transmitters in the failed set of transmitters is greater than a second threshold, perform a second recovery process;

if the number of transmitters in the failed set of transmitters exceeds a third integrity threshold, perform a third recovery process;

wherein the controller is operative to perform the first recovery process by:

(a) enabling wide-mode marshaling;

(b) selecting a ranging transmitter from the failed set of transmitters;

(c) performing a range attempt on the ranging transmitter;

(d) if the range attempt fails on the ranging transmitter, abort the current recovery process;

(e) if the range attempt succeeds on the ranging transmitter and additional transmitters remain in the failed set of transmitters, selecting a next transmitter from the failed set of transmitters as the ranging transmitter and continuing at step (c), otherwise, disabling wide-mode marshaling; and wherein the controller is operative to perform the second recovery process by:

(f) selecting a next transmitter from the faded set of transmitters as the ranging transmitter; and (g) continuing at step (c).

8. A communications network including:

a controller;

a plurality of transmitters;

a communications path communicatively coupling the controller to each of the plurality of transmitters;

the controller being operative to:

assign each of the plurality of transmitters to a particular time-slot;

perform a search loop on a first set of transmitters, the search loop allowing the controller to identify a failed set of transmitters of the plurality of transmitters, the failed set of transmitters being transmitters that are not transmitting in synchronization;

if the number of transmitters in the failed set of transmitters exceeds a first integrity threshold, perform a first recovery process and, if the first recovery process aborts and the number of transmitters in the failed set of transmitters is greater than a second threshold, perform a second recovery process;

if the number of transmitters in the failed set of transmitters exceeds a third integrity threshold, perform a third recovery process;

wherein the controller is operative to perform the first recovery process by:

(a) enabling wide-mode marshaling;

(b) selecting a ranging transmitter from the failed set of transmitters;

(c) performing a range attempt on the ranging transmitter;

(d) if the range attempt fails on the ranging transmitter, abort the current recovery process;

(e) if the range attempt succeeds on the ranging transmitter and additional transmitters remain in the failed set of transmitters, selecting a next transmitter from the failed set of transmitters as the ranging transmitter and continuing at step (c), otherwise, disabling wide-mode marshaling; and wherein the controller is operative to perform the second recovery process by:

(f) selecting a next transmitter from the failed set of transmitters as the ranging transmitter;

(g) perform a range attempt on the ranging transmitter; and (h) if the range attempt fails on the ranging transmitter and the number of transmitters remaining in the failed set of transmitters is greater than the second integrity threshold, continue processing at step (f), otherwise abort the second recovery process and disable wide-mode marshaling.

9. The communications network of claim 7, wherein the controller is operative to perform the third recovery process by:

(a) enabling wide-mode marshaling;

(b) performing a range attempt on each transmitter in the failed set of transmitters; and (c) disable wide-mode marshaling.

10. A controller communicatively coupleable to a plurality of transmitters via a plurality of communication paths within a TDMA based network, the controller being operative to:

perform a search loop to identify a failed set of transmitters of the plurality of transmitters, the failed set of transmitters being transmitters that are not transmitting in synchronization;

if the number of transmitters in the failed set of transmitters exceeds a first integrity threshold, perform a first recovery process and, if the first recovery process aborts and the number of transmitters in the failed set of transmitters is greater than a second threshold, perform a second recovery process;

if the number of transmitters in the failed set of transmitters exceeds a third integrity threshold, perform a third recovery process wherein the controller is operative to perform the first recovery process by:

(a) enabling wide-mode marshaling;

(b) selecting a ranging transmitter from the failed set of transmitters;

(c) performing a range attempt on the ranging transmitter;

(d) if the range attempt fails on the ranging transmitter, abort the current recovery process:

(e) If the range attempt succeeds on the ranging transmitter and additional transmitters remain in the failed set of transmitters, selecting a next transmitter from the failed set of transmitters as the ranging transmitter and continuing at step (c), otherwise, disabling wide-mode marshaling; and wherein the controller is operative to perform the second recovery process by:

(f) selecting a next transmitter from the failed set of transmitters as the ranging transmitter; and (g) continuing at step (c).

11. A controller communicatively coupleable to a plurality of transmitters via a plurality of communication paths within a TDMA based network, the controller being operative to:

perform a search loop to identify a failed set of transmitters of the plurality of transmitters, the failed set of transmitters being transmitters that are not transmitting in synchronization;

if the number of transmitters in the failed set of transmitters exceeds a first integrity threshold, perform a first recovery process and, if the first recovery process aborts and the number of transmitters in the failed set of transmitters is greater than a second threshold, perform a second recovery process;

if the number of transmitters in the failed set of transmitters exceeds a third integrity threshold, perform a third recovery process wherein the controller is operative to perform the first recovery process by:

(a) enabling wide-mode marshaling;

(b) selecting a ranging transmitter from the failed set of transmitters;

(c) performing a range attempt on the ranging transmitter;

(d) if the range attempt fails on the ranging transmitter, abort the current recovery process;

(e) If the range attempt succeeds on the ranging transmitter and additional transmitters remain in the failed set of transmitters, selecting a next transmitter from the failed set of transmitters as the ranging transmitter and continuing at step (c), otherwise, disabling wide-mode marshaling; and wherein the controller is operative to perform the second recovery process by:

(f) selecting a next transmitter from the failed set of transmitters as the ranging transmitter;

(g) perform a range attempt on the ranging transmitter; and (h) if the range attempt fails on the ranging transmitter and the number of transmitters remaining in the failed set of transmitters is greater than the second integrity threshold, continue processing at step (f), otherwise abort the second recovery process and disable wide-mode marshaling.

12. The controller of claim 10, wherein the controller is operative to perform the third recovery process by:

(a) enabling wide-mode marshaling;

(b) performing a range attempt on each transmitter in the failed set of transmitters; and (c) disable wide-mode marshaling.

* * * * *